United States Patent
Oerlemans

(10) Patent No.: US 11,236,722 B2
(45) Date of Patent: Feb. 1, 2022

(54) AERODYNAMIC STRUCTURE

(71) Applicant: Siemens Gamesa Renewable Energy A/S, Brande (DK)

(72) Inventor: Stefan Oerlemans, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/451,633

(22) Filed: Jun. 25, 2019

(65) Prior Publication Data
US 2020/0003177 A1 Jan. 2, 2020

(30) Foreign Application Priority Data

Jun. 27, 2018 (EP) ..................................... 18180146

(51) Int. Cl.
*F03D 1/06* (2006.01)

(52) U.S. Cl.
CPC .......... *F03D 1/0675* (2013.01); *F03D 1/0633* (2013.01); *F03D 1/0641* (2013.01); *F03D 1/0683* (2013.01); *F05B 2230/80* (2013.01); *F05B 2240/30* (2013.01); *F05B 2240/32* (2013.01)

(58) Field of Classification Search
CPC .... F03D 1/0683; F03D 1/0675; F03D 1/0633; F03D 1/0641; F03D 1/0296; F05B 2260/96; F05B 2260/962; F05B 2240/301; F05B 2240/221; F05B 2240/127; F05B 2240/32; F05B 2240/122; F05B 2240/304; B64C 2230/14; B64C 2230/28;

(Continued)

(56) References Cited

U.S. PATENT DOCUMENTS

| | | | | |
|---|---|---|---|---|
| 1,446,011 | A | * | 2/1923 | Cattley .................... B63H 1/28 416/236 R |
| 2,010,094 | A | * | 8/1935 | Leinweber .............. B64C 11/16 416/236 R |

(Continued)

FOREIGN PATENT DOCUMENTS

| | | |
|---|---|---|
| CA | 2719171 A1 | 2/2010 |
| CN | 101297112 A | 10/2008 |

(Continued)

OTHER PUBLICATIONS

Schepers et al.: "SIROCCO: Silent Rotors by Acoustic Optimization" presented at the 2nd International Meeting on Wind Turbine Noise, Lyons, France, Sep. 2007, ECN Technical Paper.

(Continued)

*Primary Examiner* — Woody A Lee, Jr.
*Assistant Examiner* — Behnoush Haghighian
(74) *Attorney, Agent, or Firm* — Schmeiser, Olsen & Watts, LLP

(57) ABSTRACT

Provided is an aerodynamic structure for mounting to a surface of a wind turbine rotor blade, which aerodynamic structure includes a number of comb elements, a comb element including comb teeth arranged in a comb plane, wherein the comb plane of a mounted comb element is essentially perpendicular to the trailing edge of the rotor blade and to the airfoil surface of the rotor blade. A wind turbine rotor blade including at least one such aerodynamic structure, and a method of equipping a wind turbine rotor blade with such an aerodynamic structure, is also provided.

15 Claims, 5 Drawing Sheets

(58) Field of Classification Search
CPC ....... B64C 21/10; B64C 23/005; B64C 23/06; B64C 23/065
See application file for complete search history.

(56) References Cited

U.S. PATENT DOCUMENTS

| | | | | |
|---|---|---|---|---|
| 2,071,012 | A * | 2/1937 | Adams | B64C 11/00 244/1 R |
| 2,099,229 | A * | 11/1937 | Possenheim | B63H 1/28 114/162 |
| 2,126,813 | A | 8/1938 | Reid | |
| 4,128,363 | A * | 12/1978 | Fujikake | F01D 5/145 416/175 |
| 5,088,665 | A * | 2/1992 | Vijgen | B64C 23/06 244/198 |
| 5,533,865 | A * | 7/1996 | Dassen | F03D 1/0608 416/228 |
| 6,105,904 | A * | 8/2000 | Lisy | B64C 3/58 244/130 |
| 6,733,240 | B2 * | 5/2004 | Gliebe | F01D 5/141 416/228 |
| 6,837,465 | B2 * | 1/2005 | Lisy | B64C 3/58 244/204.1 |
| 7,293,959 | B2 | 11/2007 | Pedersen et al. | |
| 7,566,203 | B2 | 7/2009 | Moser | |
| 7,909,576 | B1 * | 3/2011 | van der Bos | F03D 80/00 416/146 R |
| 7,914,259 | B2 * | 3/2011 | Godsk | F03D 1/0641 416/146 R |
| 7,918,653 | B2 * | 4/2011 | Standish | F03D 1/065 416/228 |
| 7,927,078 | B2 * | 4/2011 | Parsania | F03D 1/0675 416/235 |
| 7,954,769 | B2 | 6/2011 | Bushnell | |
| 7,976,283 | B2 * | 7/2011 | Huck | F03D 1/065 416/228 |
| 8,047,784 | B2 | 11/2011 | Bonnet | |
| 8,047,801 | B2 | 11/2011 | Fang et al. | |
| 8,083,488 | B2 * | 12/2011 | Fritz | F03D 1/0683 416/224 |
| 8,162,590 | B2 * | 4/2012 | Haag | F03D 1/0675 415/4.3 |
| 8,162,607 | B2 | 4/2012 | Grohmann et al. | |
| 8,182,231 | B2 * | 5/2012 | Corten | F03D 7/0256 416/223 R |
| 8,210,482 | B2 * | 7/2012 | Miller | B64C 23/06 244/200.1 |
| 8,267,657 | B2 * | 9/2012 | Huck | F03D 80/00 416/62 |
| 8,376,703 | B2 | 2/2013 | Carroll et al. | |
| 8,414,261 | B2 * | 4/2013 | Bonnet | F03D 1/0641 416/1 |
| 8,430,633 | B2 | 4/2013 | Carroll et al. | |
| 8,430,638 | B2 * | 4/2013 | Drobietz | F03D 1/0633 416/132 B |
| 8,491,262 | B2 | 7/2013 | McGrath et al. | |
| 8,506,250 | B2 * | 8/2013 | Bagepalli | F03D 1/0675 416/62 |
| 8,523,515 | B2 * | 9/2013 | Drobietz | F03D 1/0675 415/119 |
| 8,656,957 | B2 * | 2/2014 | Babinsky | F15C 1/16 137/809 |
| 8,678,746 | B2 * | 3/2014 | Haag | F03D 7/0224 415/4.3 |
| 8,746,053 | B2 | 6/2014 | Brake et al. | |
| 8,834,117 | B2 * | 9/2014 | Yarbrough | F03D 80/30 416/146 R |
| 8,882,049 | B2 | 11/2014 | Shams et al. | |
| 8,888,453 | B2 * | 11/2014 | Fuglsang | F03D 1/0641 416/1 |
| 8,894,374 | B2 * | 11/2014 | Fuglsang | F03D 1/0675 416/228 |
| 8,899,923 | B2 | 12/2014 | Hancock | |
| 9,051,919 | B2 * | 6/2015 | Jensen | F03D 1/0608 |
| 9,057,359 | B2 * | 6/2015 | Fuglsang | F03D 1/0675 |
| 9,151,270 | B2 | 10/2015 | Eisenberg et al. | |
| 9,175,666 | B2 | 11/2015 | Eisenberg et al. | |
| 9,273,667 | B2 * | 3/2016 | Enevoldsen | F03D 1/0608 |
| 9,347,427 | B2 * | 5/2016 | Fischer | F03D 1/065 |
| 9,476,406 | B2 * | 10/2016 | Obrecht | F03D 1/0675 |
| 9,546,001 | B2 | 1/2017 | Steinert et al. | |
| 9,670,901 | B2 * | 6/2017 | Obrecht | F03D 1/0633 |
| 9,719,488 | B2 * | 8/2017 | Oerlemans | F03D 1/0675 |
| 9,777,703 | B2 * | 10/2017 | Madsen | F03D 7/0256 |
| 9,841,002 | B2 * | 12/2017 | Oerlemans | F03D 1/0641 |
| 9,932,960 | B2 * | 4/2018 | Petsche | F03D 1/0683 |
| 9,945,357 | B2 * | 4/2018 | Enevoldsen | F03D 7/0204 |
| 10,012,207 | B2 * | 7/2018 | Oerlemans | F03D 1/0675 |
| 10,047,720 | B2 * | 8/2018 | Madsen | F03D 1/0641 |
| 10,180,125 | B2 | 1/2019 | Carroll et al. | |
| 10,202,963 | B2 * | 2/2019 | Altmikus | F03D 1/0675 |
| 10,240,576 | B2 * | 3/2019 | Drack | F03D 1/0641 |
| 10,247,169 | B2 * | 4/2019 | Gonzalez | F03D 1/0683 |
| 10,480,483 | B2 * | 11/2019 | Hoeg | F03D 1/0633 |
| 10,690,110 | B2 * | 6/2020 | Church | B64C 23/072 |
| 10,697,426 | B2 | 6/2020 | Hurault et al. | |
| 2001/0032907 | A1 * | 10/2001 | Borchers | B64C 7/00 244/199.1 |
| 2003/0175121 | A1 | 9/2003 | Shibata et al. | |
| 2007/0003403 | A1 | 1/2007 | Pedersen et al. | |
| 2007/0077150 | A1 * | 4/2007 | Llorente Gonzalez | F03D 1/0608 416/223 R |
| 2008/0166241 | A1 * | 7/2008 | Herr | F04D 29/38 416/241 R |
| 2009/0016891 | A1 * | 1/2009 | Parsania | F03D 1/0675 416/223 R |
| 2009/0068018 | A1 * | 3/2009 | Corten | F03D 1/0633 416/223 R |
| 2009/0074585 | A1 * | 3/2009 | Koegler | F03D 1/0675 416/228 |
| 2009/0087314 | A1 * | 4/2009 | Haag | F03D 1/0675 416/147 |
| 2009/0142193 | A1 | 6/2009 | Bech | |
| 2010/0008787 | A1 | 1/2010 | Godsk | |
| 2010/0047070 | A1 | 2/2010 | Slot et al. | |
| 2010/0080708 | A1 | 4/2010 | Gupta et al. | |
| 2010/0209258 | A1 * | 8/2010 | Fuglsang | F03D 1/0633 416/90 R |
| 2010/0291852 | A1 | 11/2010 | Steinert et al. | |
| 2011/0018282 | A1 | 1/2011 | Hayashi et al. | |
| 2011/0142635 | A1 * | 6/2011 | Fritz | F03D 1/0683 416/62 |
| 2011/0142637 | A1 * | 6/2011 | Riddell | F03D 1/0633 416/62 |
| 2011/0142673 | A1 | 6/2011 | Fang et al. | |
| 2011/0142676 | A1 | 6/2011 | Mohammed et al. | |
| 2011/0152665 | A1 | 6/2011 | Lai | |
| 2011/0211954 | A1 | 9/2011 | Bonnet | |
| 2011/0223030 | A1 * | 9/2011 | Huck | F03D 1/0675 416/228 |
| 2011/0229321 | A1 * | 9/2011 | Kilaras | F03D 1/0608 416/1 |
| 2011/0268557 | A1 | 11/2011 | Drack et al. | |
| 2011/0268558 | A1 * | 11/2011 | Driver | F03D 80/00 415/119 |
| 2012/0027590 | A1 | 2/2012 | Bonnet | |
| 2012/0070281 | A1 * | 3/2012 | Fuglsang | F03D 1/0641 416/1 |
| 2012/0134837 | A1 * | 5/2012 | Drobietz | F03D 1/0675 416/228 |
| 2012/0257977 | A1 * | 10/2012 | Jensen | F03D 1/0608 416/223 R |
| 2012/0269644 | A1 | 10/2012 | Enevoldsen et al. | |
| 2013/0071253 | A1 * | 3/2013 | Fischer | F03D 1/0608 416/228 |
| 2013/0164141 | A1 * | 6/2013 | Lin | F03D 1/0641 416/223 R |
| 2013/0223988 | A1 * | 8/2013 | Kristensen | F03D 1/0641 415/119 |

(56) References Cited

U.S. PATENT DOCUMENTS

| | | | |
|---|---|---|---|
| 2013/0266441 A1* | 10/2013 | Enevoldsen | F03D 7/0204 416/1 |
| 2013/0280085 A1* | 10/2013 | Koegler | F03D 1/0633 416/228 |
| 2013/0323070 A1* | 12/2013 | Grabau | F03D 1/0675 416/229 R |
| 2014/0048581 A1 | 2/2014 | Scirica et al. | |
| 2014/0072441 A1* | 3/2014 | Asheim | F03D 1/0633 416/241 R |
| 2014/0140856 A1* | 5/2014 | Madsen | F03D 1/0641 416/236 R |
| 2014/0219810 A1* | 8/2014 | Wurth | F03D 1/0675 416/235 |
| 2015/0010407 A1* | 1/2015 | Zamora Rodriguez | F03D 1/0633 416/236 R |
| 2015/0078896 A1* | 3/2015 | Oerlemans | F03D 1/0608 416/1 |
| 2015/0078913 A1 | 3/2015 | Enevoldsen et al. | |
| 2015/0098821 A1* | 4/2015 | Mayda | F03D 1/0633 416/23 |
| 2015/0267678 A1 | 9/2015 | Obrecht et al. | |
| 2015/0292476 A1* | 10/2015 | Obrecht | F03D 1/0675 416/228 |
| 2015/0316029 A1 | 11/2015 | Altmikus et al. | |
| 2015/0361952 A1* | 12/2015 | Petsche | F03D 1/0683 416/223 A |
| 2016/0138563 A1* | 5/2016 | Altmikus | F03D 1/0675 416/223 A |
| 2016/0252073 A1* | 9/2016 | Fuglsang | F03D 7/0256 416/23 |
| 2017/0045031 A1* | 2/2017 | Asheim | F03D 1/0633 |
| 2017/0107970 A1 | 4/2017 | Arce | |
| 2017/0122286 A1* | 5/2017 | Alexander | F03D 1/0675 |
| 2017/0138340 A1* | 5/2017 | Asheim | F03D 80/00 |
| 2017/0276117 A1* | 9/2017 | Church | F03D 1/0675 |
| 2017/0298740 A1* | 10/2017 | Vathylakis | F01D 5/28 |
| 2018/0142671 A1* | 5/2018 | Asheim | B32B 5/18 |
| 2020/0072185 A1* | 3/2020 | Wang | F04D 29/667 |

FOREIGN PATENT DOCUMENTS

| | | |
|---|---|---|
| CN | 101498276 A | 8/2009 |
| CN | 102720631 A | 10/2012 |
| CN | 103987622 A | 8/2014 |
| CN | 104279129 A | 1/2015 |
| CN | 104454378 A | 3/2015 |
| CN | 104870808 A | 8/2015 |
| CN | 104976075 A | 10/2015 |
| CN | 106414999 A | 2/2017 |
| CN | 106481517 A | 3/2017 |
| EP | 1338793 A3 | 9/2010 |
| EP | 2647835 A1 | 10/2013 |
| EP | 2921697 A1 | 9/2015 |
| EP | 3096003 A1 | 11/2016 |
| EP | 3181895 A1 | 6/2017 |
| WO | 2014048581 A1 | 4/2014 |
| WO | WO 2014048581 A1 | 4/2014 |
| WO | 2015167604 A1 | 11/2015 |
| WO | 2016001420 A1 | 1/2016 |
| WO | 2017180192 A1 | 10/2017 |
| WO | WO 2017180192 A1 | 10/2017 |

OTHER PUBLICATIONS

Oerlemans Stefan: "Detection of aeroacoustic sound sources on aircraft and wind turbines", http://doc.utwente.hl/67363/1/thesis S Oerlemans.pdf, chapter 8, ISBN 978-90-80-6343-9-8; 2009.

Oerlemans Stefan: "Detection of aeroacoustic sound sources on aircraft and wind turbines", http://doc.utwente.nl/67363/1/thesis S Oerlemans.pdf, chapters, ISBN 978-90-80-6343-9-8; 2009.

Office Action in corresponding Chinese Patent Application No. 201910567148.6 dated Jun. 16, 2020. 8 pages.

Office Action in corresponding Chinese Patent Application No. 201910567148.6 dated Aug. 11, 2021. 17 pages.

* cited by examiner

AERODYNAMIC STRUCTURE

CROSS-REFERENCE TO RELATED APPLICATIONS

This application claims priority to European application No. 18180146.5, having a filing date of Jun. 27, 2018, the entire contents of which are hereby incorporated by reference.

FIELD OF TECHNOLOGY

The embodiments of the invention describe an aerodynamic structure for a wind turbine rotor blade, a wind turbine rotor blade with such an aerodynamic structure, and a method of equipping a wind turbine rotor blade with an aerodynamic structure.

BACKGROUND

The level of noise generated by a wind turbine is a major factor that determines whether permission will be given to erect a wind turbine of that type, particularly when the site is close to a residential area. Generally, the noise originating from the aerodynamic rotor is regarded as most troublesome. Therefore, much effort is being invested in finding ways to reduce the noise generated by wind turbine rotor blades as these move through the air. The simplest way to reduce noise originating from an aerodynamic rotor is to reduce its rotational speed, but this is directly associated with a substantial penalty in power output. Therefore, it would be more preferable to identify other ways of reducing the level of noise.

For a large wind turbine with rotor blade lengths in excess of 20-30 m, the dominant noise source is trailing edge noise. Eddies develop when the air flows over the suction side or the pressure side, resulting in turbulence passing the trailing edge of the blade. The noise that mainly arises when this turbulence passes the trailing edge is referred to as "trailing edge noise". The cause of trailing edge noise can also be regarded as the scattering of unsteady surface pressures at the trailing edge. The unsteady surface pressures are the "footprint" of the turbulent boundary layer, i.e. they are caused by the pressure field of the turbulent eddies in the boundary layer. Trailing edge noise is mainly generated in the outboard portion of a rotor blade, on account of the higher rotational velocities towards the outer end of the rotor blade.

There are various ways of modifying a rotor blade with the aim of reducing trailing edge noise. For example, instead of a straight trailing edge, the trailing edge can be given a serrated or "sawtooth" shape along an outer portion of the rotor blade. The serrations effectively reduce the scattering of vortices at the trailing edge. However, while such a serrated edge can reduce the trailing edge noise to some extent, it cannot eliminate the noise completely. Therefore, while trailing edge serrations can reduce trailing edge noise, significant noise levels remain.

The noise-reducing effect of trailing edge serrations can be improved by arranging comb elements between the serrations. A comb element originates along the edges of two adjacent serrations, and terminates at a terminating line defined by the tips of those serrations. Such comb elements lie in the same plane as the serrations, i.e. the comb teeth lie close to the main airflow direction. The beneficial acoustic effect of such comb elements may be understood to arise from diffusion of a horseshoe vortex (i.e. the combs between serrations break up a large vortex into smaller vortices) and/or dissipation of some of the energy in the turbulent airflow.

While serrations and in-plane comb elements can have a noticeable positive effect on the trailing edge noise by diffusing turbulence immediately behind the trailing edge, they do not have a significant effect on turbulence that is present upstream of the trailing edge. Therefore, the known solutions have limited capability in reducing the aerodynamic noise generated by a rotor blade.

SUMMARY

An aspect relates to an improved way of reducing the noise generated by a wind turbine rotor blade.

According to the embodiment of the invention, the aerodynamic structure is to be mounted to a surface of a wind turbine rotor blade and comprises a number of comb elements, a comb element comprising comb teeth (also referred to as comb fibres) arranged in a comb plane, characterized in that the comb plane of a mounted comb element is essentially perpendicular to the trailing edge of the rotor blade and to the airfoil surface of the rotor blade. All teeth or fibres of a comb element lie in a common plane, i.e. the comb plane.

A mounting surface can be a surface of the rotor blade airfoil. Equally, a mounting surface can be the surface of a trailing edge assembly arranged along the trailing edge of the rotor blade. A comb element that is essentially parallel to the mounting surface and/or essentially parallel to the trailing edge need not be precisely perpendicular to the mounting surface or the trailing edge, and the plane of a comb element may differ from the normal in each case by a few degrees. The comb elements can be mounted upstream and/or downstream of the trailing edge. A comb element of the inventive aerodynamic structure extends in a direction outward from the mounting surface, and therefore does not lie in the plane of the main airflow direction. In other words, the plane of a comb element is not parallel to the airfoil surface or trailing edge assembly surface, but is essentially perpendicular to it. The inventive comb element therefore acts as a spanwise separator in the boundary layer, and can serve to "smoothen" any instabilities in the boundary layer as this passes over the trailing edge of the rotor blade. The terms "span-wise separator" and "comb element" may be regarded as synonyms in the following unless otherwise indicated. The inventive aerodynamic structure is realised to counteract a specific source of aerodynamic noise, namely turbulence close to the trailing edge. The effect of the spanwise separators or comb elements is to break up the vortices in such turbulence, so that the airflow is made more homogenous as it passes over the trailing edge. The inventive aerodynamic structure can therefore effectively reduce aerodynamic noise arising from turbulence near the trailing edge.

Used in its accepted sense, a "comb element" may be understood to comprise a set of comb teeth or comb fibres that extend from the inner mounting line to an outer terminating line. The inner ends of the comb teeth lie along the mounting line and the outer ends of the comb teeth lie along the terminating line.

A comb element is preferably mounted to the rotor blade so that its comb teeth subtend an angle in the range of 0° to 45° to the mounting surface. A span-wise separator comb element therefore has an essentially triangular shape, and the terms "span-wise separator" and "triangle comb element" may be used as synonyms in the following unless otherwise indicated. Depending on the realisation of the aerodynamic structure, the triangle comb elements can act to "slice" or "cut" the incoming airflow, or can act to push the incoming airflow further outward from the airfoil surface, as will be explained below. To counteract the forces acting on the flexible teeth of the comb element as an airflow passes over the rotor blade, a span-wise separator comb element may comprise one or more supporting ribs arranged to maintain the desired angle of inclination between the comb element and the mounting surface of the rotor blade.

The wind turbine rotor blade comprises at least one instance of the inventive aerodynamic structure mounted on a mounting surface of the rotor blade.

The noise emissions of a wind turbine that is equipped with such rotor blades can be effectively reduced. During operation of the wind turbine, the rotor blades move through the air, so that an airflow passes over a rotor blade, and the airflow will first pass over the inventive aerodynamic structure before reaching the trailing edge of the rotor blade. Turbulence near the trailing edge of a rotor blade can be effectively diffused by the span-wise separators, so that the wind turbine may fulfil the requirements of applicable acoustic noise regulations when operating at its rated power output.

Particularly advantageous embodiments and features of the invention are given by the dependent claims, as revealed in the following description. Features of different claim categories may be combined as appropriate to give further embodiments not described herein.

Preferably, a span-wise separator is arranged on a mounting means that can be attached to a mounting surface, for example to an airfoil surface of the rotor blade. Alternatively or in addition, a mounting surface can be a surface of a trailing edge assembly of the rotor blade.

As mentioned above, the comb plane of a mounted comb element can be essentially perpendicular to the trailing edge of the rotor blade and also to the airfoil surface of the rotor blade. Effectively, the mounting line of such a span-wise separator comb element extends in a direction that is essentially perpendicular to the trailing edge of the rotor blade. However, centrifugal effects can result in the airflow exhibiting a diagonal "sweep" towards the tip of a rotor blade. Therefore, in a preferred embodiment of the invention, depending on its outboard position, the mounting line of a span-wise separator comb element can subtend an angle of up to 45° to the trailing edge. Preferably, the mounting lines of the more inboard comb elements are essentially perpendicular to the trailing edge of the rotor blade, while the mounting lines of the more outboard comb elements gradually subtend ever greater angles to the trailing edge, so that the most outboard comb element subtends an angle of up to 45° to the trailing edge.

It shall be understood that the mounting means of the aerodynamic structure is attached to the airfoil surface of the blade in a span-wise direction, i.e. in a direction defined by a line extending between the blade root and the blade tip, or in a direction defined by the trailing edge of the rotor blade, so that the comb elements are arranged in a span-wise direction. In a preferred embodiment of the invention, the mounting means of the inventive aerodynamic structure is attached to the airfoil surface of the rotor blade at a distance inward (i.e. upstream) from the trailing edge. The distance inward from the trailing edge can be determined by computation using suitable models and/or on the basis of observations obtained from tests such as wind tunnel tests, acoustic measurements in the field, etc. In such an embodiment, the mounting line is effectively arranged at a distance upwind of the trailing edge. Equally, the inventive aerodynamic structure can be realised so that the comb elements terminate along or beyond the trailing edge of the rotor blade. In either of these realisations, the aerodynamic structure preferably comprises a plurality of such span-wise separator comb elements arranged at intervals of 0.5-5 cm in the outboard region of the rotor blade.

Alternatively or in addition, the mounting surface can be the surface of a trailing edge assembly of the rotor blade, for example a comb element can be mounted to a serration of a serrated trailing edge assembly. In such a realisation, the aerodynamic structure preferably comprises one or more span-wise separator comb elements on each serration.

A comb element can be made of any suitable material, for example plastic. A comb element can be made using any suitable technique such as injection moulding, casting, etc. Preferably, the comb fibres/teeth are parallel to each other, and are spaced apart by a sufficiently large distance. For example, comb fibres may have a diameter in the order of 1 mm, and may be spaced apart by a distance that is about the same as the comb fibre diameter.

The aerodynamic structure can be constructed in any suitable manner. In one preferred embodiment of the invention, the aerodynamic structure is manufactured by forming the comb elements and embedding the teeth of a comb element to a suitable depth in the mounting means along a mounting line. The series of points from which the teeth of a comb element extend outward from the mounting means may be regarded collectively as the "mounting line" of that comb element. In an alternative embodiment, the aerodynamic structure is manufactured by forming the comb elements and gluing the inner ends of the teeth of a comb element along a mounting line on the surface of the mounting means. In a further alternative embodiment, the aerodynamic structure is manufactured by forming the comb elements, forming holes in the mounting means along a mounting line and, from underneath the mounting means, passing the teeth of a comb element through the holes. The mounting means may be realised as a strip of material (for example plastic) that is glued or otherwise attached to the outer surface of the rotor blade, so that an already existing rotor blade may be retro-fitted with one or more instances of the inventive aerodynamic structure.

An embodiment of the inventive aerodynamic structure can be mounted to the suction side of the rotor blade. Alternatively or in addition, an embodiment of the inventive aerodynamic structure can be mounted to the pressure side of the rotor blade.

As mentioned above, the shape of a triangle comb element or span-wise separator is defined by the inner mounting line and the outer terminating line. The mounting line of a comb element is preferably straight; similarly, the terminating line is preferably straight. The terminating line of such a comb element also extends in a direction that is essentially perpendicular to the airfoil surface of the rotor blade. In such an embodiment, when the comb element is mounted upstream of the trailing edge, the comb element has an overall triangular shape, with the apex of the triangle furthest from the trailing edge. When the triangular comb elements are mounted on serrations of a trailing edge assembly, the apex of the triangle can coincide with the trailing edge. In a preferred embodiment of the invention, the aerodynamic structure comprises a series of such upright comb elements that act as span-wise separators, i.e. the comb elements "slice through" or separate the airflow passing over the rotor blade, with the effect of diffusing or breaking up the span-wise coherence of boundary layer turbulence near the trailing edge. The aerodynamic structure can extend over the outboard 50% of the rotor blade, and may comprise such "upright" triangle comb elements arranged at intervals along the mounting means. The characteristics of the comb planes (spacing, height etc.) may vary as a function of their radial position along the rotor blade.

As mentioned in the introduction, a wind turbine rotor blade can be equipped with serrations along a portion of its trailing edge for the purpose of reducing aerodynamic noise. In a preferred embodiment of the invention, the aerodynamic structure is realised so that the mounting line of a comb element coincides with a centre line of a serration. In other words, a comb element is arranged in line with each serration. The effect of this arrangement is to improve the span-wise separation of turbulence in the airflow upstream of the trailing edge serrations.

As explained above, it is also known to arrange an in-plane comb element between serrations, i.e. a comb element that lies in the same plane as the trailing edge serrations. A further dissipation of the turbulence around the trailing edge can be achieved by arranging a comb element to "cut" the serration plane. Therefore, in a preferred embodiment of the invention, the comb teeth of a comb element originate near a point between two neighbouring serrations (for example just upstream of the trailing edge), and the terminating line of the comb element is essentially perpendicular to the plane containing the serrations. In such a realisation, the comb element has an overall fan shape that is at right angles to its neighbouring serrations. This type of comb element can have a beneficial effect in reducing turbulence near the trailing edge. Of course, such upright "fan comb elements" can also be used in addition to any of the embodiments above that comprise a plurality of triangle comb elements mounted to a mounting surface.

One of the noise reduction mechanisms associated with a serrated trailing edge is that the suction side boundary layer can be pushed away from the airfoil surface, increasing the distance between the suction side turbulence and the trailing edge, and reduces the acoustic scattering efficiency, i.e. the transformation of turbulence into acoustic pressure.

Another way of achieving such an effect is to arrange an additional aerodynamic element on the suction side of the airfoil. This additional element can have the form of an elongated plane or rectangle aligned in parallel to the trailing edge and inclined at an angle in the range of 0° to 45° relative to the airfoil surface of the rotor blade, so that this planar element acts as a type of "canopy" to push the suction side boundary layer away from the airfoil surface. This has the attendant beneficial effect described above, namely to move larger boundary layer vortices further outward from the airfoil surface in order to suppress acoustic scattering at the trailing edge. Preferably, such a planar element extends along the outer half or outer third of the rotor blade.

BRIEF DESCRIPTION

Some of the embodiments will be described in detail, with references to the following Figures, wherein like designations denote like members, wherein.

DETAILED DESCRIPTION

In the diagrams, like numbers refer to like objects throughout. Objects in the diagrams are not necessarily drawn to scale.

Figure 1:
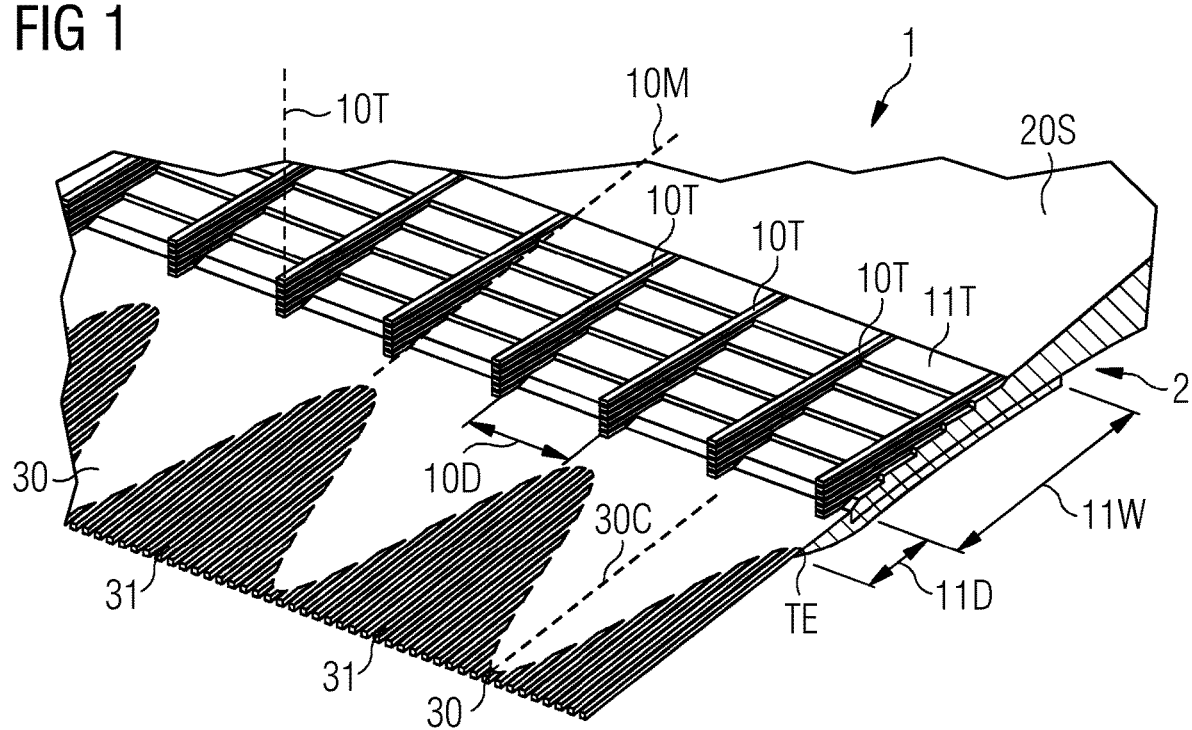
FIG. 1 shows an embodiment of an aerodynamic structure.

FIG. 1 shows an embodiment of the inventive aerodynamic structure 1, attached to the suction side 20S of a wind turbine rotor blade 2. In this exemplary embodiment, the aerodynamic structure 1 comprises a number of triangle comb elements 10T arranged on a mounting means 11T in such a way that the comb elements 10 act as span-wise separators. These can be separated by a distance of 0.5-5 cm. The mounting means 11T has a depth or width 11W to accommodate the comb elements 10T, and is mounted at a distance 11D from the trailing edge TE of the rotor blade 2.

Each triangle comb element 10T has a shape defined by an inner mounting line M and an outer terminating line T. Here, the mounting line M of each comb element 10T extends in a direction that is essentially perpendicular to the trailing edge TE of the rotor blade 2, and the terminating line T of each comb element 10T extends in a direction that is essentially perpendicular to the airfoil surface 20S of the rotor blade 2. In this exemplary embodiment, the mounting line M can extend over a length of 3-10 cm, for example, and the terminating line T can extend to a height of up to 4 cm.

The rotor blade 2 also has a serrated trailing edge assembly, i.e. a series of serrations 30 is arranged along the trailing edge TE to reduce the aerodynamic noise arising from the flow of vortices past the rotor blade's trailing edge as it passes through the air. The drawing also shows additional in-plane comb elements 31 between neighbouring serrations 30, with the aim of further reducing the trailing edge noise.

The triangle comb elements 10T are arranged evenly along the mounting means 11T, and are separated by a distance 10D. In this embodiment, there are about two span-wise separators per serration 30, arranged so that the mounting line M of every second comb element 10T extends along the centre lines 30C of a serration 30. Alternatively, up to ten such triangle comb elements 10T could be arranged along the mounting means for every serration 30 at the trailing edge TE.

Instead of a single row of span-wise separators as shown here, the mounting means may carry two or more rows of span-wise separators. For example, one row of span-wise separators can be arranged upstream of a second row of span-wise separators. Alternatively, a staggered arrangement can be provided, in which the span-wise separators of a second row start in between the span-wise separators of a first row.

Figure 2:
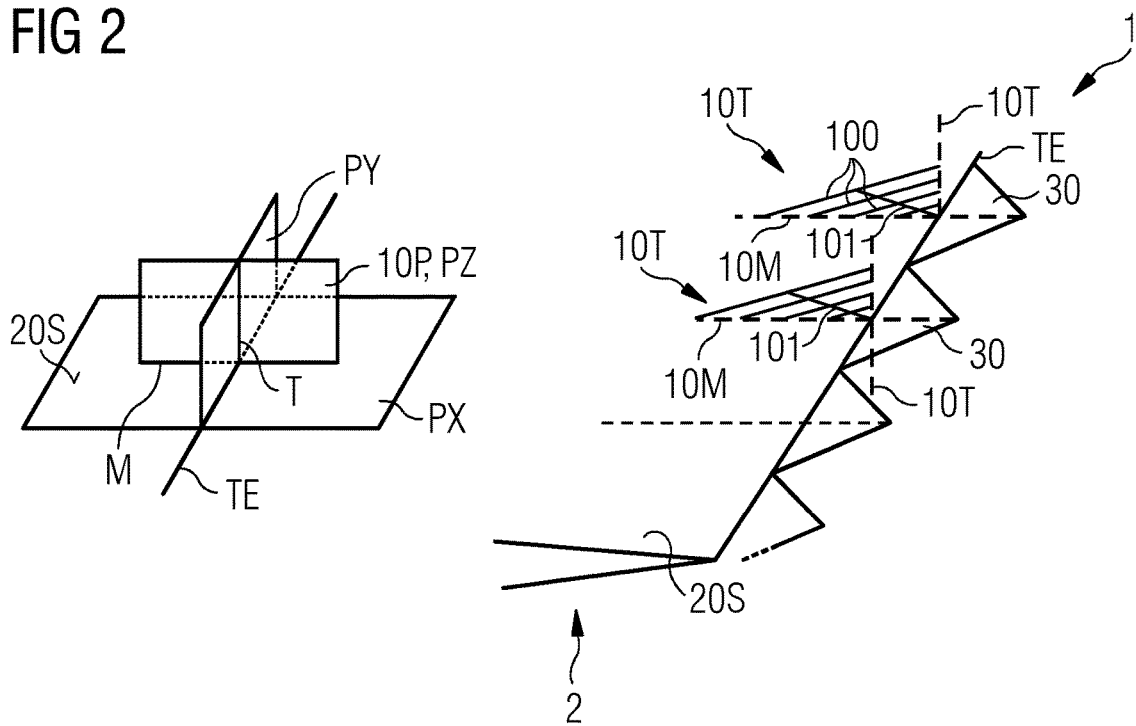
FIG. 2 shows an alternative embodiment of the aerodynamic structure of FIG. 1.

Another version of this embodiment is shown in FIG. 2, which (for the sake of clarity) shows just one such comb element 10T per serration 30. The diagram also indicates the parallel arrangement of comb teeth 100 as these extend from the mounting line M to the perpendicular terminating line T. The comb teeth 100 or comb fibres 100 are essentially aligned with the main flow direction over the surface of the rotor blade 2. The diagram also shows a supporting rib 101 that acts to maintain the upright shape of a comb element 10T.

In this embodiment, the mounting means 11T is attached to the airfoil surface 20S of the rotor blade in such a way that the terminating lines T of the comb elements 10T effectively intersect with the trailing edge TE of the rotor blade 2. On the left-hand side of the diagram, three intersecting planes PX, PY, PZ are shown. The comb plane 10P of a triangle comb element or span-wise separator 10T coincides with plane PZ, which is effectively perpendicular or orthogonal to plane PX of the airfoil surface 10S, and also to plane PY which contains the trailing edge TE and which is perpendicular to plane PX.

Figure 3:
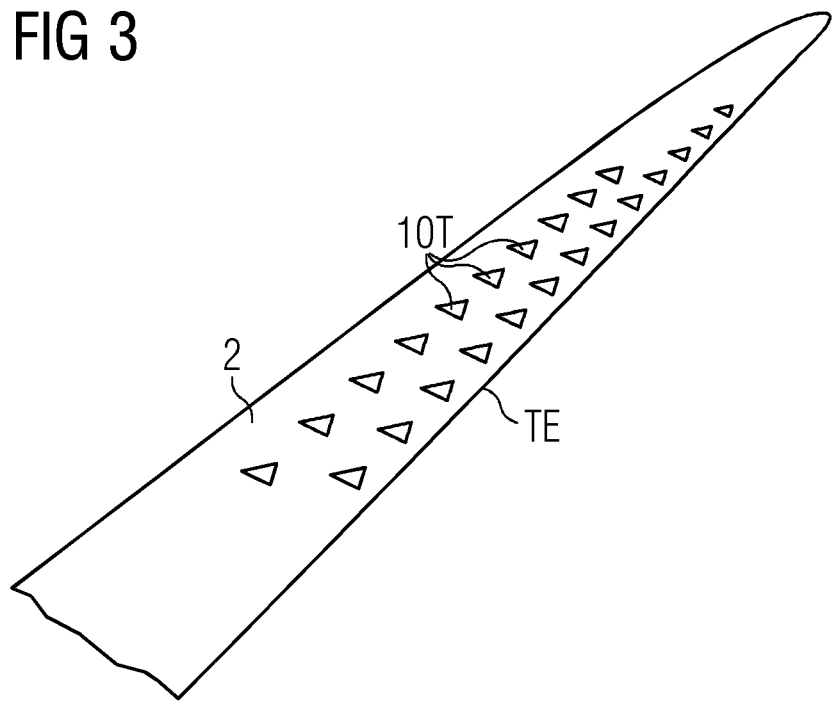
FIG. 3 shows a further embodiment of the aerodynamic structure.

FIG. 3 shows another embodiment, in this case with two rows of comb elements 10T mounted upstream of the trailing edge TE. For clarity, the diagram only indicates an outboard portion f a rotor blade 2. The comb elements 10T of one row are offset from the comb elements 10T of the other row. In this exemplary embodiment, the spacing between comb elements 10T decreases with increasing radial distance outward along the rotor blade 2. The size of the comb elements 10T can decrease towards the tip of the rotor blade. Of course, more than two rows of comb elements 10T may be used, and the rows need not comprise the same number of comb elements, and can comprise comb elements of different sizes.

Figure 4:
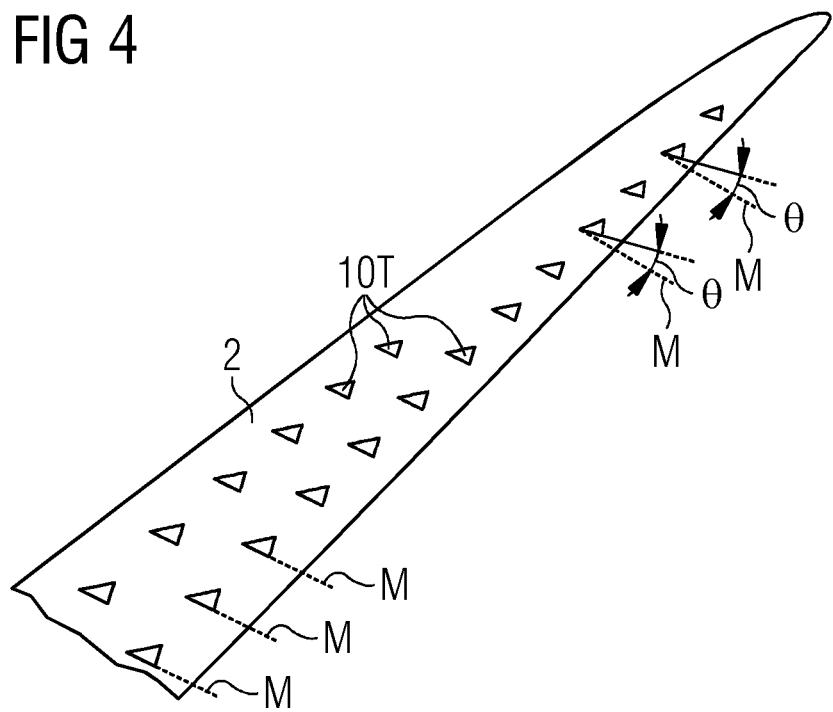
FIG. 4 shows an alternative embodiment of the aerodynamic structure of FIG. 3.

FIG. 4 shows another possible embodiment of the inventive aerodynamic structure. Again, two rows of comb elements 10T are shown. In this case, the comb elements 10T of the rows are mounted in line with each other. In this exemplary embodiment, the size of the comb elements 10T decrease with increasing radial distance outward along the rotor blade 2. In this embodiment, the mounting lines M of the comb elements 10T subtend a right angle to the trailing edge at the more inboard position, while the more outboard comb elements 10T have mounting lines M that subtend larger angles θ to the trailing edge TE.

Of course, any combination of these embodiments can be used. For example, an arrangement of offset rows with relatively large comb elements and relatively large spacing intervals may be used in the more inboard part of the outermost blade half. Smaller comb elements at smaller spacing intervals may be used in the remainder of the outboard part of the rotor blade.

Figure 5:
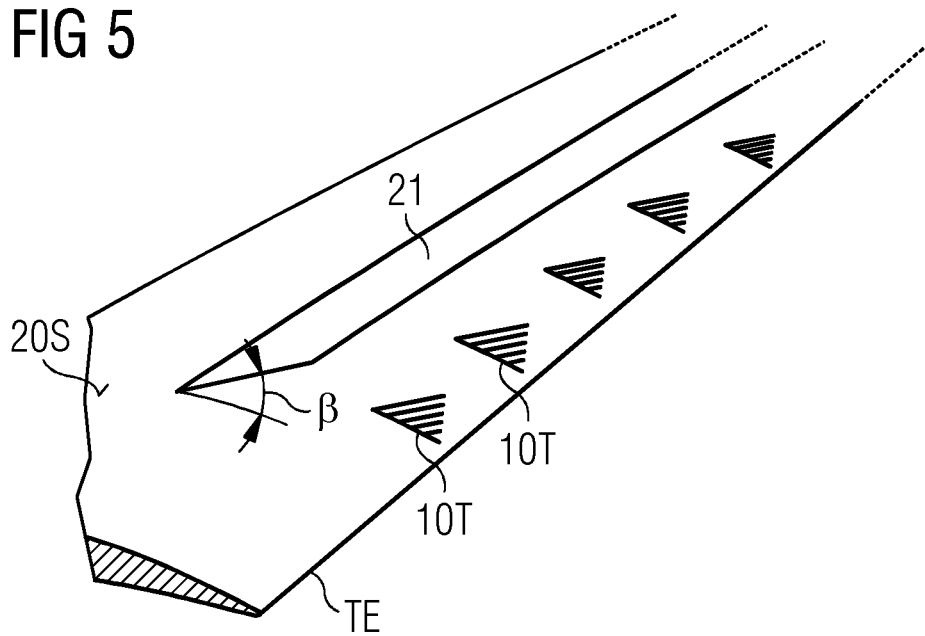
FIG. 5 shows an alternative realisation of a comb element.

FIG. 5 shows another embodiment, in which a row of span-wise separators are arranged along the trailing edge TE of a rotor blade 2. In this embodiment, a planar "canopy" 21 is also mounted to the suction side 20S of the blade 2 in order to assist in pushing the boundary layer away from the suction side of the blade 2. The canopy 21 is preferably inclined at a low angle β of less than 45° relative to the airfoil surface 20S. The canopy 21 and the arrangement of span-wise separators can be mounted on a common mounting means that is then attached to the airfoil surface 20S, or these can be mounted separately.

Figure 6:
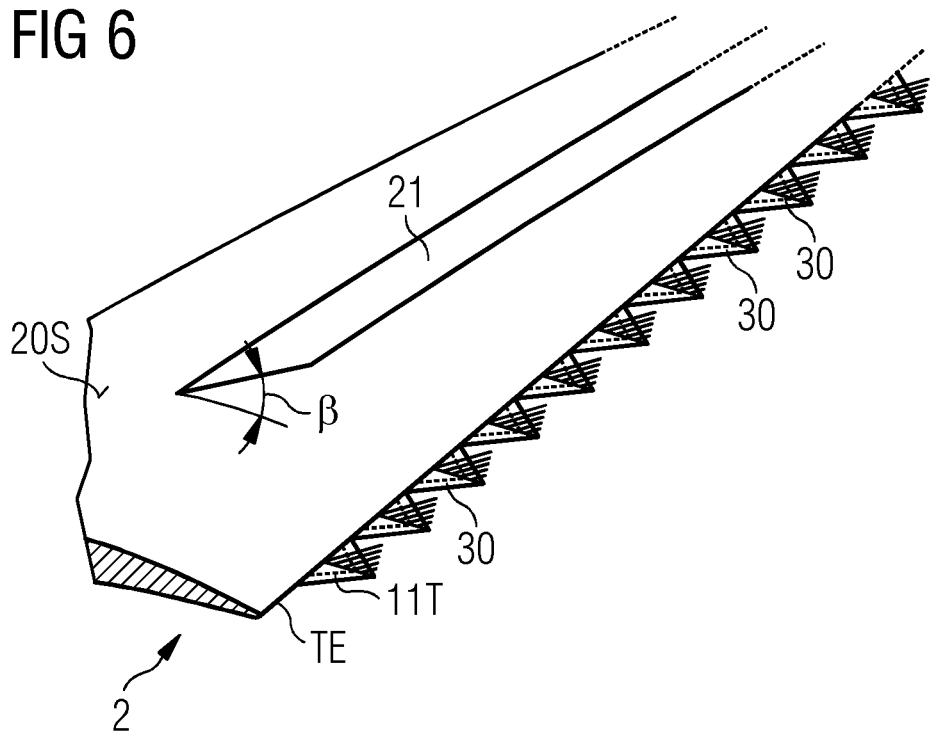
FIG. 6 shows a rotor blade of a wind turbine.

Another version of this embodiment is shown in FIG. 6. Here, the span-wise separators are mounted on serrations 30 of a trailing edge assembly. The mounting means 11T in this case can be a triangular adhesive sheet that fits onto the outer surface of a serration 30. This diagram also shows an additional planar canopy 21 that can be mounted to the airfoil surface 20S, with the purpose of pushing turbulence away from the surface.

Figure 7:
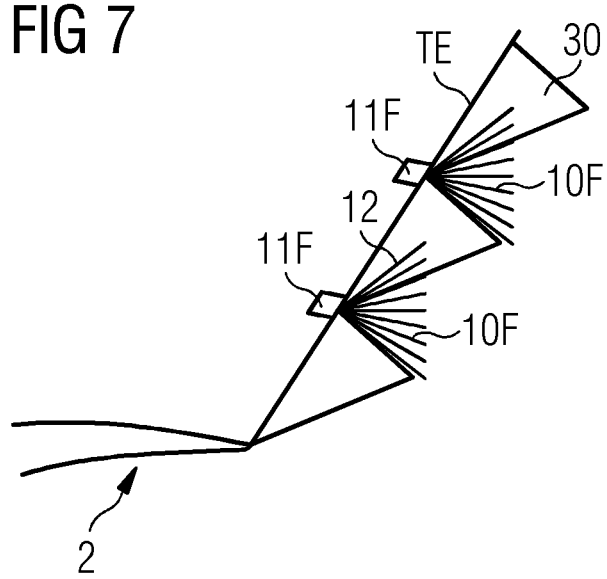
FIG. 7 illustrates the development of turbulence over a rotor blade.

FIG. 7 shows an alternative embodiment. Here, a fan-shaped comb element 10F is arranged between adjacent serrations 30 along the trailing edge TE of the rotor blade 2. The terminating line 12T of the fan comb element 10F is perpendicular to the plane of the serrations 30. The effect of such a fan comb element 10F is to further diffuse the turbulent flow between serrations 30, and such a fan comb element 10F can be used in any of the embodiments described above, for example in place of any in-plane comb elements between serrations 30 along the trailing edge TE. A fan comb element 10F can be formed so that all comb teeth originate at an apex between serrations or just upstream of such a point. A mounting means 11F can be any suitable means that can attach the comb element 10F between the serrations 30.

Figure 8:
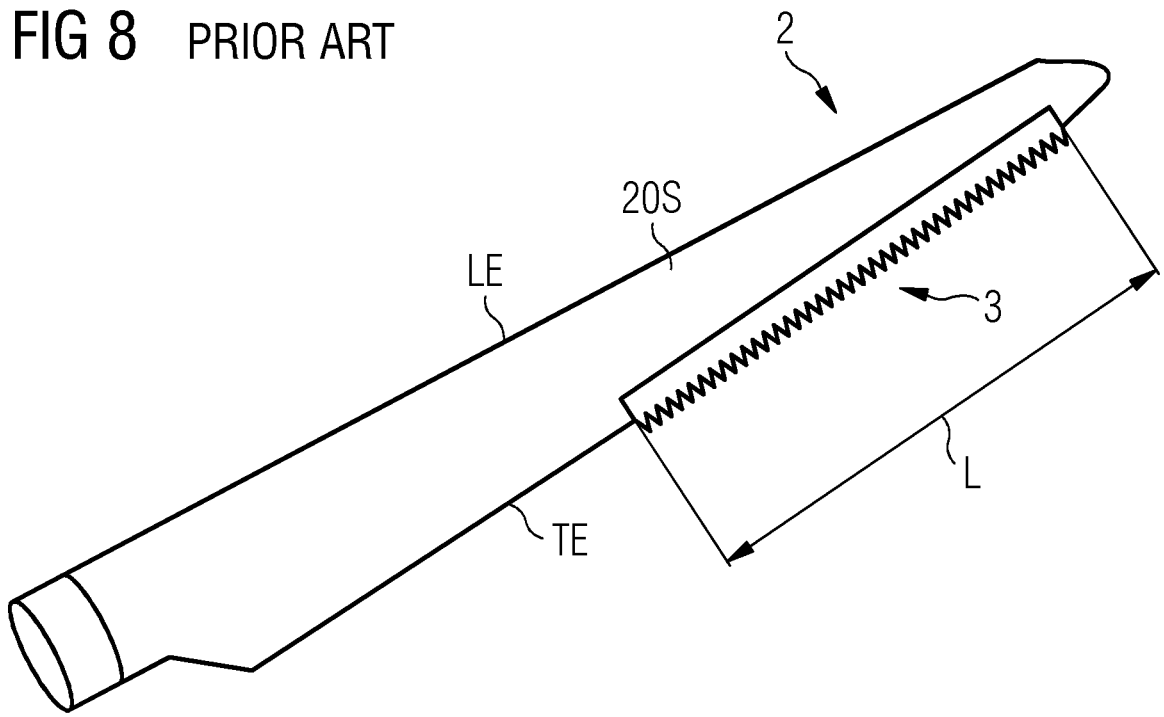
FIG. 8 show a rotor blade of a conventional wind turbine with a serrated component attached to the rotor blade.

FIG. 8 shows a rotor blade 2 of a wind turbine. The diagram shows the leading edge LE, trailing edge TE and suction side 20S. In the prior art, it is known to attach a serrated component 3 along a mounting length L of the trailing edge TE in the outboard part of the rotor blade. In the embodiments of the inventive aerodynamic structure 1 described above, the mounting means may be assumed to be attached in a direction parallel to the trailing edge TE over a similar mounting length L.

Figure 9:
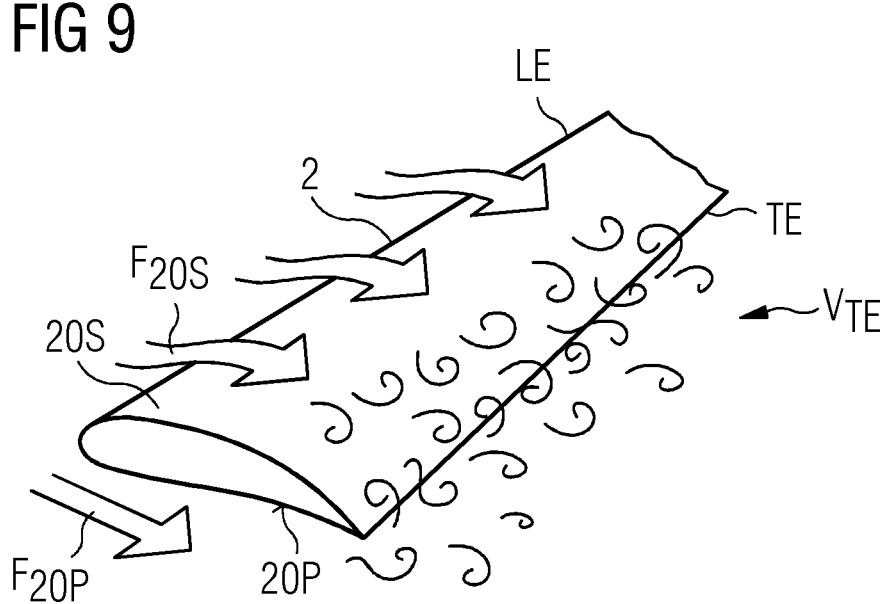
FIG. 9 illustrates the development of turbulence as a rotor blade moves in a direction of rotation.

FIG. 9 illustrates the development of turbulence as a rotor blade 2 moves in a direction of rotation. The diagram shows an initially laminar airflow $F_{20s}$ in the boundary layer over the suction side 20S of the rotor blade 2, and an initially laminar airflow $F_{20P}$ in the boundary layer over the pressure side 20P of the rotor blade 2. The boundary layer generally cannot remain stable, so that, as the airflow passes over the airfoil, trailing edge turbulence $V_{TE}$ develops. Acoustic noise is generated from the breakup of vortices in the turbulence region $V_{TE}$.

Although the diagrams mainly show an aerodynamic structure in place on the suction side of the rotor blade, it will be understood that an aerodynamic structure can—alternatively or in addition—be arranged on the pressure side. As explained above, the inventive aerodynamic structure acts to reduce the aerodynamic noise generated as a result of turbulence upstream of the trailing edge. Therefore, although some diagrams indicate a serrated trailing edge, it shall be understood that such a serrated trailing edge is not required by the inventive aerodynamic structure but can be implemented on account of its contribution in reducing trailing edge noise.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An aerodynamic structure for mounting to a surface of a rotor blade of a wind turbine, comprising:
   a plurality of comb elements, each comb element of the plurality of comb elements comprising a set of comb teeth extending from an inner mounting line to an outer terminating line, wherein inner ends of the comb teeth are disposed along the inner mounting line and outer ends of the comb teeth are disposed along the outer terminating line;
   wherein the set of comb teeth are stacked in a comb plane defined by the inner mounting line and the outer terminating line, each layer of comb teeth aligned with a neighboring layer of comb teeth;

wherein the inner mounting line extends in a direction that is perpendicular to a trailing edge of the rotor blade and the outer terminating line extends in a direction that is perpendicular to an airfoil surface of the rotor blade.

2. The aerodynamic structure according to claim 1, wherein the plurality of comb elements are mounted to the airfoil surface of the rotor blade.

3. The aerodynamic structure according to claim 2, wherein the plurality of comb elements are arranged at intervals of 0.5 cm to 5 cm between the inner mounting line and the outer terminating line.

4. The aerodynamic structure according to claim 1, wherein additional comb elements are mounted onto a serration of a serrated trailing edge assembly of the rotor blade.

5. The aerodynamic structure according to claim 1, wherein the comb teeth are inclined at an angle in a range of 0° to 45° relative to the mounting surface.

6. The aerodynamic structure according to claim 1, wherein additional comb elements are mounted between serrations of a serrated trailing edge assembly of the rotor blade.

7. A wind turbine rotor blade comprising:
at least one aerodynamic structure comprising:
a plurality of comb elements, each comb element of the plurality of comb elements comprising a set of comb teeth extending from an inner mounting line to an outer terminating line, wherein inner ends of the comb teeth are disposed along the inner mounting line and outer ends of the comb teeth are disposed along the outer terminating line;
wherein the set of comb teeth are stacked in a comb plane defined by the inner mounting line and the outer terminating line, each layer of comb teeth aligned with a neighboring layer of comb teeth;
wherein the inner mounting line extends in a direction that is perpendicular to a trailing edge of the rotor blade and the outer terminating line extends in a direction that is perpendicular to an airfoil surface of the rotor blade.

8. The wind turbine rotor blade according to claim 7, wherein the airfoil surface is a suction side of the wind turbine rotor blade.

9. The wind turbine rotor blade according to claim 7, wherein the airfoil surface is a pressure side of the wind turbine rotor blade.

10. The wind turbine rotor blade according to claim 7, further comprising a series of serrations along the trailing edge, wherein the inner mounting line extends along a centre line of a serration.

11. The wind turbine rotor blade according to claim 7, further comprising a series of serrations along the trailing edge, and further comprising a serration comb element arranged between two adjacent serrations, wherein comb teeth of the serration comb element originate at an apex formed by the adjacent serrations, and wherein the comb teeth of a serration comb element terminate along a terminating line that is essentially perpendicular to a plane containing the serrations.

12. A method of equipping a rotor blade of a wind turbine with an aerodynamic structure, the method comprising:
forming a comb element comprising a set of comb teeth extending from an inner mounting line to an outer terminating line, wherein inner ends of the comb teeth are disposed along the inner mounting line and outer ends of the comb teeth are disposed along the outer terminating line;
wherein the set of comb teeth are stacked in a comb plane defined by the inner mounting line and the outer terminating line, each layer of comb teeth aligned with a neighboring layer of comb teeth;
arranging the comb element on an airfoil surface of the rotor blade such that the comb plane is perpendicular to a trailing edge of the rotor blade and to the airfoil surface of the rotor blade.

13. The aerodynamic structure according to claim 1, wherein the set of comb teeth are stacked in the direction that is perpendicular to an airfoil surface of the rotor blade.

14. The wind turbine rotor blade according to claim 7, wherein the set of comb teeth are stacked in the direction that is perpendicular to an airfoil surface of the rotor blade.

15. The method according to claim 12, wherein the set of comb teeth are stacked in the direction that is perpendicular to an airfoil surface of the rotor blade.

\* \* \* \* \*